United States Patent Office 2,832,854
Patented Apr. 29, 1958

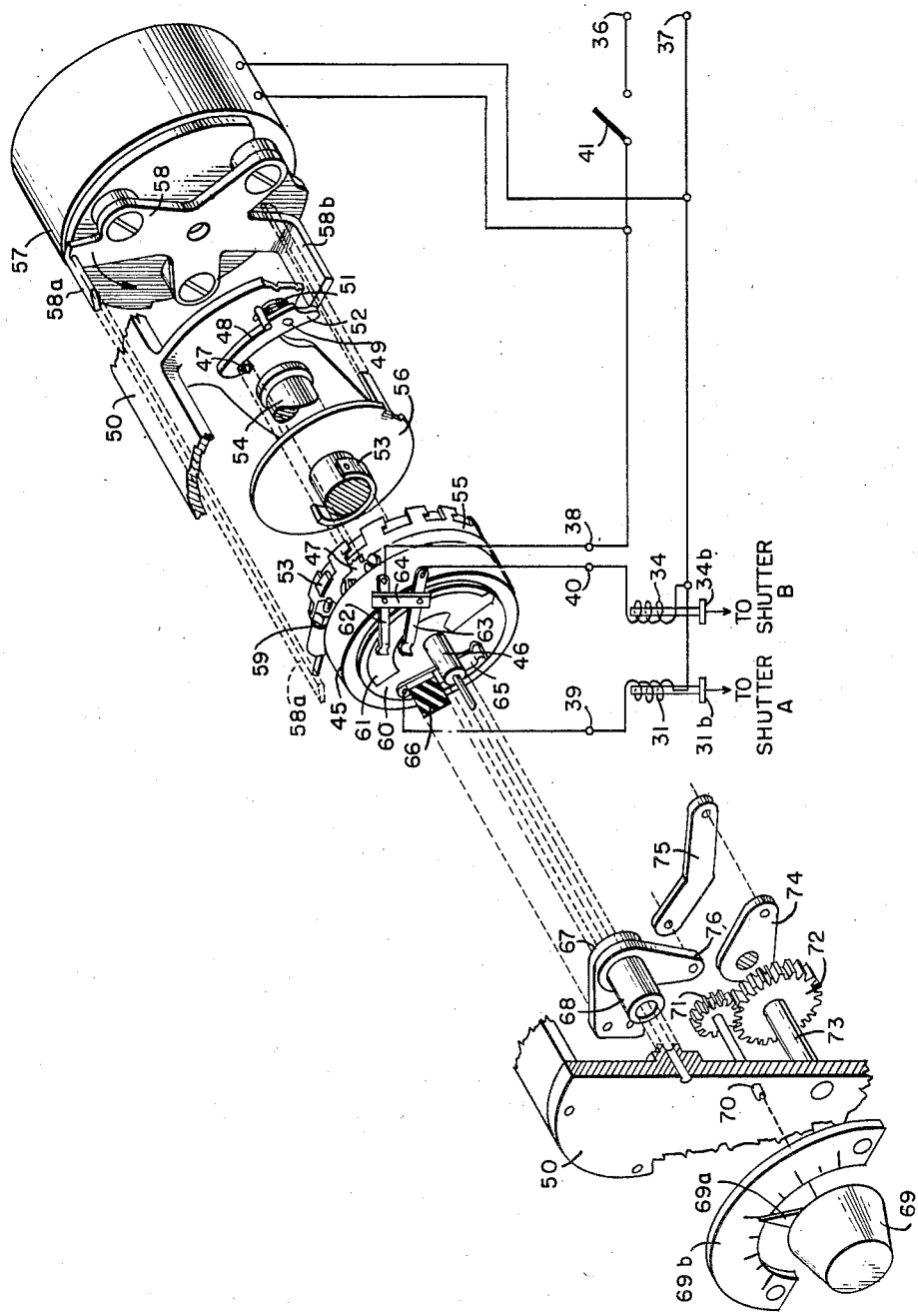

2,832,854

ADJUSTABLE PRECISION ELECTRO-MECHANICAL TIMER

Irving W. Doyle, Massapequa, and Clayton W. Houghton, Westbury, N. Y., assignors to Fairchild Camera and Instrument Corporation, a corporation of Delaware Original application March 5, 1953, Serial No. 340,557. Divided and this application September 21, 1953, Serial No. 381,263

10 Claims. (Cl. 200—24)

This invention relates to adjustable precision electro-mechanical timers and, while it is of general application, it is particularly adapted for timing the successive operations of the sections of a two-section camera shutter.

This application is a division of copending application, Serial No. 340,557, filed March 5, 1953, entitled "Shutter-Actuating Mechanism for Cameras."

In certain timing applications, such as the timing of the sections of a two-section camera shutter, it is desired to develop in response to a single tripping or triggering action two electrical pulses having a very small but precisely determined time spacing adjustable over a relatively wide range of values. In such a camera application, these two spaced pulses are then utilized independently to energize the actuating elements of the sections of the shutter in rapid sequence, the time spacing between the pulses determining the exposure time of the shutter.

Electromechanical timers of the prior art for determining very short but adjustable time intervals have generally relied upon either an escapement mechanism or a damping vane or equivalent rotatable in a damping medium, such as air. It has been found that the accuracy of such timers tends to vary considerably with variations in their environment, such as variations in ambient temperature. In addition, such timers usually have a considerably lower percentage accuracy over the portion of their operating range providing minimum time intervals. In general, they are also difficult to adjust over a wide range of timing intervals.

It is an object of the present invention, therefore, to provide a new and improved adjustable precision electro-mechanical timer which obviates one or more of the foregoing disadvantages of prior electromechanical timers.

It is another object of the invention to provide a new and improved adjustable precision electromechanical timer which has a high degree of relative accuracy of timing intervals approximately uniform over its normal range of adjustment.

It is a further object of the invention to provide a new and improved adjustable precision electromechanical timer which is readily adjustable over a relatively wide range of timing intervals.

It is a further object of the invention to provide a new and improved adjustable precision electromechanical timer which maintains a high degree of accuracy notwithstanding substantial variations in ambient temperature or other factors of environment.

In accordance with the invention, a precision electromechanical timer for developing a pair of electrical pulses adjustably spaced in time comprises first electric contact means and second electric contact means co-operating with the first contact means and relatively movable with respect thereto, one of such contact means including a pair of spaced contacts. The timer also includes means for imparting a predetermined acceleration to the relatively movable contact means for developing time-spaced electrical pulses, and means throughout the range of relative movement for adjusting the spacing of the pair of contacts to vary the time spacing of the developed electrical pulses.

For a better understanding of the present invention, together with other and further objects thereof, reference is had to the following description taken in connection with the accompanying drawing, while its scope will be pointed out in the appended claims.

The single figure of the drawing is an exploded perspective view of a precision electromechanical timer embodying the invention and corresponding to that illustrated in Fig. 2 of aforesaid copending application, Serial No. 340,557, to which certain of the circuit connections of Fig. 1 of said application have been added for the sake of completeness.

Referring now to the drawing, there is illustrated a precision electromechanical timer for developing in response to a single tripping or triggering action a pair of electrical pulses adjustably spaced in time. This timer includes a normally latched biased inertia member which may be in the form of a rotatable inertia disc or wheel 45 mounted on a shaft 46 and having a projecting arm 47 normally engaged by a latch 48 mounted on a pivot 49 extending from a frame member 50 and biased into engagement with the arm 47 by a spring 51 for restraining the inertia member 45. The latch 48 has a projecting tailpiece 52 for use in releasing the latch, as described hereinafter. The inertia wheel 45 is biased for rotation in a counterclockwise direction by means of a spiral spring 53, the inner end of which is secured to a shaft 54 and the outer end of which is secured to a cup-shaped retaining element 55 within which the spring 53 is housed. The end of the retainer 55 is closed by a retaining plate 56.

There is provided a rotatable armature electromagnet 57 for initially winding the spring 53 and then releasing the latch 48 and the inertia wheel 45 to impart a predetermined acceleration thereto under the influence of its biasing spring 53 to effect an exposure and subsequently to reset the wheel 45. The electromagnet 57 is provided with a rotary armature 58 biased into the position illustrated by an internal spring (not shown) and, upon energization, rotatable in a counterclockwise direction, as indicated by the arrow. The armature 58 drives the shaft 54 to wind spring 53 and includes an axially extending arm 58a which serves as a stop for an adjustable stop screw 59 extending from the inertia wheel 45, the elements 58a, 59 serving to limit the counterclockwise movement of the wheel 45 under the influence of its biasing spring 53. Extending from the armature 58 is a trip arm 58b disposed upon rotation to engage the upper surface of the tailpiece 52 of the latch 48 to release the arm 47, thereby to permit counterclockwise rotation of inertia wheel 45 under the influence of its biasing spring 53

The face of the inertia wheel away from the spring retainer 55 carries a disc of insulation material 60 which, in turn, carries a movable electric contact means such as a rotatable arcuate contact segment 61. Co-operating with the contact segment 61 is a stationary electric contact means including a pair of stationary or fixed contact brushes 62 and 63 supported from the frame 50 by means of a block of insulation material 64 and connected to the terminals 38 and 40, respectively, the brush 62 being in continuous engagement with the contact segment 61 and the brush 63 normally being out of engagement therewith. Also co-operating with the contact segment 61 is an adjustable stationary contact brush 65 mounted on a block of insulation material 66 secured to an angularly adjustable crank arm 67 having a hub 68 rotatable on the shaft 46. The fixed contact 63 and the adjustable contact 65 comprise a pair of spaced contacts which are normally out of engagement with, but are engaged in sequence by, the rotatable contact segment 61. Specifically, upon rotation of the inertia wheel 45 when released by the electromagnet 57, it will be noticed that the conductive segment 61 initially makes contact with the movable contact brush 65 and subsequently with the fixed contact brush 63, the contact segment 61 being continuously in contact with brush 62. Thus, the contact brushes 63 and 65 are spaced physically to produce time-spaced electrical impulses upon rotation of the inertia wheel 45.

The precision timer also includes means for adjusting the spacing of the contacts 63 and 65 to vary the time spacing of the electrical impulses, and thus the exposure period of the shutter mechanism controlled by the timer, preferably as a logarithmic function of the adjusting member. This adjusting means may be in the form of a manually rotatable adjusting element or knob 69 mounted on a shaft 70 and connected to said brush 65 through a linkage including a pair of spur gears 71, 72 and a shaft 73 carrying a crank arm 74. The crank 74 is pivoted to one end of a link 75, the other end of which is pivoted to a crank 76 secured to the hub 68 to which the arm 67 is also secured. The linkage comprising elements 74, 75, and 76 are empirically proportioned to provide a time spacing of the output pulses which varies approximately as the logarithm of the angular displacement of the knob 69 and input shaft 70 over a major portion of its range of adjustment. Knob 69 is provided with a pointer 69a co-operating with a scale 69b, which may be calibrated to indicate camera exposure time, as explained hereinafter.

The precision timer of the invention may be utilized to control the exposure time of a two section camera shutter by providing a control circuit schematically represented in the drawing. Specifically, this circuit comprises a pair of supply terminals 36, 37, the terminal 36 being connected through a switch 41 to an input terminal 38 connected to the brush 62 of the timer. It is understood that the switch 41 represents any suitable means, manual or automatic, for supplying to the timer a single tripping or triggering pulse of a duration equal at least to the maximum camera exposure. The timer also is provided with output terminals 39, 40 connected to the brushes 63, 65 of the timer, the spaced electrical output pulses appearing between the terminals 38, 39 and 38, 40. The terminals 39, 40 are connected to corresponding terminals of actuating electromagnets 31, 34, the other terminals of which are connected in common to supply terminal 37. The electromagnets 31, 34 are provided with armatures 31b, 34b connected to shutter section A and shutter section B, respectively, of a two-section camera shutter, as described in aforesaid copending application, Serial No. 340,557. The electromagnet 57 is also connected to be energized from the supply terminals 36, 37 through switch 41.

In brief, the operation of the timer is initiated by closing of the switch 41 to energize the rotary electromagnet 57. The magnet armature 58 is rotated counterclockwise driving shaft 54 and winding spring 53, its arm 58b subsequently tripping the latch 48 to release the arm 47 of the inertia wheel 45. The wheel 45 then rotates clockwise under the influence of its spring 53 and, in so doing, makes successive contacts between the contact segment 61 and the contact brushes 65 and 63, thereby developing time-spaced electrical impulses at the terminals 39, 40, respectively. By adjustment of the knob 69, the angular position of the arm 67 carrying the contact 65 may be adjusted to vary the spacing between the stationary contact brush 63 and the movable contact brush 65. Upon tripping of the latch 48, as described, the spring 53 accelerates the inertia wheel 45 so that its velocity progressively increases throughout its range of movement but follows the same law of variation under all operating conditions. Therefore, the time spacing of electrical impulses so generated varies in correspondence with the angular spacing of the contact brushes 63 and 65 so that the scale 69b associated with the knob 69 may be calibrated directly in terms of camera exposure time. The relationship of parts is such that the minimum time spacing of the electrical impulses corresponds to an angular position of movable brush 65 such that the timing is determined by the final and highest velocity portion of the range of movement of the inertia wheel 45, thus facilitating the setting of the mechanism for minimum camera exposures with the greatest precision. When the electromagnet is de-energized, its biasing spring (not shown) returns it to the position illustrated and in so doing resets the inertia disc 45 with its arm 47 behind the latch 48.

In the operation of the timer, as described above, it is effective to actuate the shutter sections A and B in sequence with a time spacing dependent upon the adjustment of the timer. Upon closing of switch 41 the electromagnet 57 is energized to initiate operation of the timer, as described. At a time dependent upon the setting of the brush 65 by the knob 69, the movable contact segment 61 engages the brush 65 and develops an initial electric pulse at the output terminal 39. This pulse energizes the electromagnet 31 which actuates the shutter section A to initiate the exposure. A predetermined time interval thereafter the contact segment 61 engages the stationary brush 63 to develop at the output terminal 40 a second electric pulse for energizing the electromagnet 34 to actuate the shutter section B and complete the camera exposure. This cycle of operation may be repeated for effecting subsequent exposures by supplying further single triggering pulses by means of the supply terminals 36, 37 and the switch 41, or equivalent.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A precision electromechanical timer for developing a pair of electrical pulses adjustably spaced in time comprising: first electric contact means; second electric contact means co-operating with said first contact means and relatively movable with respect thereto, one of said contact means including a pair of spaced contacts; means for imparting a predetermined acceleration to said relatively movable contact means throughout the range of relative movement for developing time-spaced electrical pulses; and means for adjusting the spacing of said pair of contacts to vary the time spacing of the developed electrical pulses.

2. A precision electromechanical timer for developing a pair of electrical pulses adjustably spaced in time comprising: movable electric contact means; stationary electric contacts means co-operating with said movable contact means, one of said contact means including a pair of spaced contacts; means for imparting a predetermined acceleration to said movable contact means throughout its range of movement for developing time-spaced electrical pulses; and means for adjusting the spacing of said pair of contacts to vary the time spacing of the developed electrical pulses.

3. A precision electromechanical timer for developing a pair of electrical pulses adjustably spaced in time comprising: an inertia member having movable electric contact means; stationary electric contact means co-operating with said movable contact means, one of said contact means including a pair of spaced contacts; means including a biasing spring and a latch for said inertia member to impart a predetermined acceleration to said movable contact means throughout its range of movement for developing time-spaced electrical pulses; and means for adjusting the spacing of said pair of contacts to vary the time spacing of the developed electrical pulses.

4. A precision electromechanical timer for developing a pair of electrical pulses adjustably spaced in time comprising: an inertia disc having movable electric contact means; stationary electric contact means co-operating with said movable contact means, one of said contact means including a pair of spaced contacts; means including a biasing spring and a latch for said inertia disc to impart a predetermined acceleration to said movable contact means throughout its range of movement for developing time-spaced electrical pulses; and means for adjusting the spacing of said pair of contacts to vary the time spacing of the developed electrical pulses.

5. A precision electromechanical timer for developing a pair of electrical pulses adjustably spaced in time comprising: a rotatable inertia member having movable electric contact means; stationary electric contact means co-operating with said movable contact means, one of said contact means including a pair of spaced contacts; a spring for biasing said inertia member for rotation throughout its range of movement; a latch for restraining said inertia member; means responsive to a tripping effect for releasing said latch to impart a predetermined acceleration to said movable contact means throughout its range of movement for developing time-spaced electrical pulses; and means for adjusting the spacing of said pair of contacts to vary the time spacing of the developed electrical pulses.

6. A precision electromechanical timer for developing a pair of electrical pulses adjustably spaced in time comprising: a rotatable inertia member having movable electric contact means; stationary electric contact means co-operating with said movable contact means, one of said contact means including a pair of spaced contacts; a spring for biasing said inertia member for rotation throughout its range of movement; a latch for restraining said inertia member; a rotatable-armature electromagnet responsive to a tripping signal for winding said spring and for releasing said latch to impart a predetermined acceleration to said movable contact means throughout its range of movement for developing time-spaced electrical pulses; and means for adjusting the spacing of said pair of contacts to vary the time spacing of the developed electrical pulses.

7. A precision electromechanical timer for developing a pair of electrical pulses adjustably spaced in time comprising: a movable contact segment; stationary electric contact means including a fixed contact in continuous engagement with said segment and a pair of spaced contacts normally out of engagement with said segment; means throughout its range of movement for imparting a predetermined acceleration to said movable contact segment throughout its range of movement to engage said pair of contacts in succession for developing time-spaced electrical pulses; and means for adjusting the spacing of said pair of contacts to vary the time spacing of the developed electrical pulses.

8. A precision electromechanical timer for developing a pair of electrical pulses adjustably spaced in time comprising: a movable contact segment; stationary electric contact means including a pair of fixed contact brushes, one in continuous engagement with said segment and one normally disengaged therefrom, and an adjustable contact brush normally disengaged from said segment; means for imparting a predetermined acceleration to said movable contact segment throughout its range of movement to engage said normally disengaged contact brushes in succession for developing time-spaced electrical pulses; and means for adjusting said adjustable brush to vary the time spacing of the developed electrical pulses.

9. A precision electromechanical timer for developing a pair of electrical pulses adjustably spaced in time comprising: a movable contact segment; stationary electric contact means including a pair of fixed contact brushes, one in continuous engagement with said segment and one normally disengaged therefrom, and an adjustable contact brush normally disengaged from said segment; means for imparting a predetermined acceleration to said movable contact segment throughout its range of movement to engage said adjustable contact brush and said normally disengaged fixed brush in sequence for developing time-spaced electrical pulses; and means for adjusting said adjustable brush to vary the time spacing of the developed electrical pulses, whereby the minimum time spacing of the developed pulses corresponds to a position of said adjustable brush such that the timing is determined by the highest velocity portion of the range of movement of said movable segment.

10. A precision electromechanical timer for developing a pair of electrical pulses adjustably spaced in time comprising: movable electric contact means; stationary electric contact means co-operating with said movable contact means and including a fixed contact and an adjustable contact; means for imparting a predetermined acceleration to said movable contact means throughout its range of movement for developing time-spaced electrical pulses; and means for adjusting said adjustable contact to vary the time spacing of the developed electrical pulses including a manually rotatable adjusting element and a mechanical linkage interconnecting said element and said adjustable contact for imparting an approximately logarithmic function to the adjustment-time spacing characteristic of the timer.

References Cited in the file of this patent

UNITED STATES PATENTS

| | | |
|---|---|---|
| 673,274 | Leonard | Apr. 30, 1901 |
| 1,494,986 | Behm | May 20, 1924 |
| 1,969,926 | Eickhoff | Aug. 14, 1934 |
| 2,547,199 | Dezzani | Apr. 3, 1951 |
| 2,608,625 | Riesz | Aug. 26, 1952 |